United States Patent [19]

Levenson et al.

[11] 4,278,559
[45] Jul. 14, 1981

[54] METHOD FOR PROCESSING SPENT NUCLEAR REACTOR FUEL

[75] Inventors: Milton Levenson, Menlo Park; Edwin L. Zebroski, Los Altos, both of Calif.

[73] Assignee: Electric Power Research Institute, Palo Alto, Calif.

[21] Appl. No.: 878,392

[22] Filed: Feb. 16, 1978

[51] Int. Cl.³ .................. C09K 3/00; C01G 43/00; C01G 56/00
[52] U.S. Cl. .................. 252/301.1 R; 423/4; 423/8; 423/10; 423/18; 423/19; 423/251
[58] Field of Search .................. 423/10, 18, 8, 4, 251, 423/19; 252/301.1 R

[56] References Cited

U.S. PATENT DOCUMENTS

| | | | |
|---|---|---|---|
| 2,864,664 | 12/1958 | Spencer et al. | 423/8 |
| 2,874,025 | 2/1959 | Moore | 423/8 |
| 3,067,121 | 12/1962 | Lindström et al. | 252/301.1 R |
| 3,357,802 | 12/1967 | Anderson | 423/10 |
| 3,677,743 | 7/1972 | Walsh et al. | 252/301.1 R |
| 3,714,324 | 1/1973 | Weech | 423/10 |
| 4,182,652 | 1/1980 | Puechl | 252/301.1 R |

OTHER PUBLICATIONS

Levenson et al., "Energy Technology," vol. 5, pp. 230–255 (1978).
Hummell et al., Nucleonics, 21 (#1), pp. 43–47 (Jan. 1963).
Levenson et al., "Peaceful Uses of Atomic Energy", vol. 5, pp. 143–156, International Atomic Energy Agency, Vienna, U.N. (1972) N.Y., N.Y.

Primary Examiner—Edward A. Miller
Attorney, Agent, or Firm—Flehr, Hohbach, Test

[57] ABSTRACT

A method and apparatus for processing spent nuclear reactor fuel wherein plutonium is continuously contaminated with radioactive fission products and diluted with uranium. Plutonium of sufficient purity to fabricate nuclear weapons cannot be produced by the process or in the disclosed reprocessing plant. Diversion of plutonium is prevented by radiation hazards and ease of detection.

13 Claims, 3 Drawing Figures

FIG_1

FIG_2

FIG_3

METHOD FOR PROCESSING SPENT NUCLEAR REACTOR FUEL

BACKGROUND OF THE INVENTION

This invention generally relates to the reprocessing of spent nuclear reactor fuel and, more particularly, to techniques for preventing the unauthorized diversion of plutonium.

Fast breeder reactors are designed to extract useful energy from our natural resources, namely uranium and thorium. It is an essential part of the fuel cycle of these reactors to reprocess plutonium. Currently a number of countries including the United States, The United Kingdom, France, Germany, Russia, India and Japan are processing plutonium and purifying it by various processes. About a dozen additional countries have operated extraction processes on a laboratory or pilot scale. About thirty-two additional countries have nuclear research establishments with evident technical potential or capability for reprocessing plutonium.

There is serious concern throughout the world that the increasing deployment of reprocessing capacity for nuclear reactor fuel will increase the likelihood of further proliferation of nuclear weapons. This concern is due to the fact that essentially all processing methods used to date are derived from the processes originally developed during or shortly after World War II for producing plutonium for nuclear weapons. This concern has been led by the United States Government which since 1977 has taken the position that such processes are undesirable for civilian power use because they potentially make purified fissionable materials available and therefore susceptible to diversion by terrorist groups. In addition, there is concern because such reprocessing plants could readily be converted over to the extraction of weapons material by a change of intention by a government which had previously pledged by treaty to forego the production of nuclear weapons.

Figure 3:
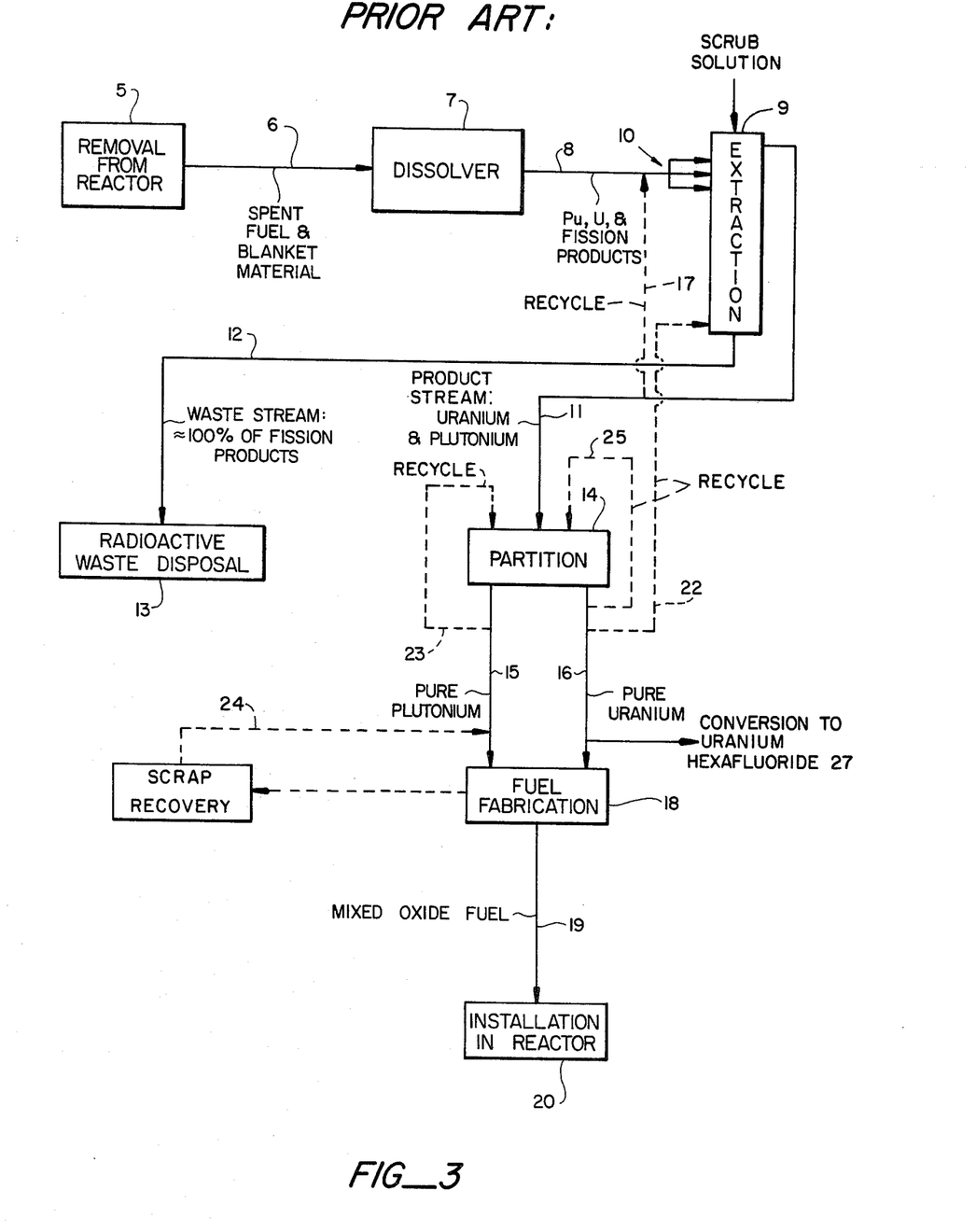
FIG. 3 is a diagram illustrating the method for processing spent fuel according to the prior art.

By way of background, FIG. 3 illustrates schematically one of the currently used processes for reprocessing spent nuclear fuel. The fuel is first removed from a nuclear reactor 5 and is stored for varying periods of time, typically at least three months, in order to allow the short-lived fission products to decay. This material 6 includes both spent fuel and, in the case of a breeder reactor, blanket material. The material is next transferred to a dissolver 7 where it is dissolved into a liquid solution 8. To facilitate dissolution of fuel, the cladding and fuel is cut up into small segments prior to transfer to the dissolver. This is called the "chop and leach" method of conversion.

The liquid solution 8, FIG. 3 from the dissolver 7 is then passed to a contacting device where the step of extraction 9 is performed. This step includes two or three extraction cycles at the end of which the uranium and plutonium are essentially completely separated from each other and from the accompanying radioactive fission products. A contactor is a mechanical device for bringing two liquid phases into contact and for causing the uranium and plutonium to be transferred from a water phase to an organic phase or conversely. The product stream 11 coming out of the extractor contains uranium and plutonium with only 0.01% to 0.1% of the fission products. The other discharge stream 12 from the extraction process is a waste stream containing nearly 100% of the fission products. The fission products in the waste stream are usually concentrated and stored, eventually to be solidified and stored 13 is a radioactive waste disposal area.

The product stream 11, FIG. 3 from the extraction process 9 goes to a second contactor where the step of partitioning 14 occurs. The contactors fractionate the uranium and plutonium into an essentially pure plutonium stream 15, and a pure uranium stream 16. The contactors make a plutonium stream 15 that contains less than 0.1% uranium and traces of fission products. The remaining traces of fission products and uranium are removed from the plutonium stream by second and third cycles 23. These cycles may be either further solvent extraction and stripping cycles, or alternate methods such as ion exchange absorption-elution cycles using resins or silica gel columna. Similarly, the uranium stream is subject to two or three added cycles of purification 25, usually using solvent extraction and stripping cycles, supplemented by fluoride volatility separation which can be conveniently obtained if the uranium is to be further processed in an isotope separation process using uranium hexafluoride. The pure plutonium stream 15 is then passed through subsequent processes 18 where a mixed oxide fuel 19 is fabricated. The mixed oxide fuel is then installed 20 back into the reactor for further power generation. The uranium stream may be used either for fuel fabrication, or converted to uranium hexafluoride 27 for feed to an isotope separation plant.

It should be appreciated that plutonium is produced at numerous points in this process which is sufficiently pure to be used for weapons material. The pure plutonium stream 15, FIG. 3 is one example. In addition, plutonium mixed with uranium and only low levels of fission products is present in the extraction product stream 11. Purified plutonium solutions or compounds offer the least obstacle to diversion because they can be transported with no more radiation shielding than that provided by ordinary containers. Detection by radiation detectors of theft or diversion is difficult and can be circumvented by small thicknesses of material. Pure plutonium emits only an alpha particle, a low-energy, low-abundance X-ray, and, from reactor-grade plutonium, a small flux of neutrons.

In the past coprocessing has been suggested to increase diversion resistance. In coprocessing the uranium and plutonium product streams are maintained together throughout the fuel recycling process by limiting the efficiency of the partitioning step 14 but with a high degree of separation from fission products. This increases the resistance to diversion somewhat, since further chemical steps are necessary to obtain weapons-usable plutonium. In addition, a greater bulk of material must be diverted in order to obtain sufficient material to make a weapon.

Of itself coprocessing does not provide sufficient improvement in diversion resistance. The product is still low in radioactivity and difficult to detect in ordinary containers if diversion is attempted. In addition, the usual process design and equipment layout provides for conveniently repeating process steps by returning a product stream to a feed tank for a second pass through part or all of the process. In FIG. 3 the paths for recycling streams are illustrated in dotted lines 17, 22, 23, 24 and 25. With such provisions the added diversion resistance effect of coprocessing can be thwarted by suitable recycling.

Another prior approach for increasing diversion resistance has been to perform the complete separation of uranium, plutonium, and fission products by a solvent extraction process as generally described in FIG. 3. Uranium and plutonium of high purity are produced in two separate streams and then mixed prior to storage, shipping, and fuel fabrication. The resultant stream, for example, 20% plutonium and 80% uranium by weight, cannot be directly used to fabricate a nuclear weapon.

This latter approach has limited benefit to diversion resistance since the detectibility of attempted diversion is not enhanced, and the chemical separation of plutonium from uranium is a relatively simple process in the absence of fission products. In addition, pure plutonium is potentially divertable within the plant before it is mixed into the uranium product stream.

OBJECTS AND SUMMARY OF THE INVENTION

The basic concept of this invention is that plutonium can be made highly resistant to diversion through a combination of changes in the method of reprocessing spent fuel and changes in the design of a reprocessing plant. The concept is that plutonium in weapons-usable form is not produced at any point in the process, that mixtures containing plutonium are always kept sufficiently radioactive, that attempted diversion is easy to detect, and that no readily available change in the process operation can be made to yield weapons usable material. The design of the plant is such that even if the plant were occupied by hostile forces, the length of time, the skills and resources required, and the complexity of converting it over to produce separated plutonium are comparable to the efforts required to assemble a crude military-style reprocessing plant from scratch. Furthermore, attempts to modify the process involve overt changes in equipment and in flow patterns. Such attempts are readily detected so that there is timely warning available that diversion is being attempted.

According to the present invention nowhere in the process is plutonium completely separated from uranium and fission products. Plutonium is always diluted with an excess of uranium such that it cannot be directly made into a nuclear weapon. The residual penetrating radiation from long-lived fission products facilitates detection of attempted theft or diversion of even small amounts of material. The residual radiation also presents a biological hazard to a diverter if larger amounts are handled.

In this invention the plant and the method of reprocessing are such that anyone who diverts a significant amount of plutonium from the plant must take with it sufficient radioactive fission products to require the use of another chemical separation process in order to obtain usable material. It is the intent of the present invention to make the materials produced in this process comparable in resistance to diversion (for weapons purposes) to an equivalent amount of spent fuel from conventional light water reactors.

The present invention contemplates a diversion resistant process such that substantial amounts of additional capital, equipment, time, organization, force, and sophisticated skills are required to obtain material of weapons grade purity. In addition, the plant is so designed that the modifications required to obtain material of weapons grade material are extensive and easily detectable by a wide variety of surveillance and inspection methods and by either local or international inspectors.

One feature of the present invention is that approximately three fourths of the equipment currently used in a conventional reprocessing plant is eliminated. A conventional plant typically has several solvent extraction or other auxiliary purification cycles and their associated equipments to achieve sufficient purity in its product streams. The present invention contemplates using less than one complete cycle. The absence of the associated pumps, tanks, and plumbing of the subsequent cycles provides for a simpler operation as well as precludes the production of weapons usable material.

A further benefit of the present invention is that the cost of reprocessing spent fuel is substantially reduced. The recycle of off-specification product streams is avoided by design, so that high operating factors for the plant are practical. Although the cost of the subsequent remote fabrication of fuel is increased, there is a potential net reduction in total cost due to the reduction in the size of the facility, the reduction in the complexity of the process, and the increase in assurance of effective safeguards, which can reduce institutional obstacles and physical security costs.

The foregoing and other objects are achieved by a method and apparatus for processing spent nuclear reactor fuel. Spent fuel is first dissolved to produce a spent fuel stream containing plutonium, uranium and a varying mixture of short-lived and long-lived fission products in solution. Next, the plutonium and uranium (together with a substantial quantity of radioactive fission products) are extracted using an organic solvent and discharged together into a product stream. This product stream is thereafter partitioned into a uranium product stream and a plutonium-containing product stream. The plutonium-containing product stream contains some fission products and a quantity of uranium equal to or greater than the quantity of plutonium. In all of these steps and in every piece of apparatus plutonium continuously is both diluted with uranium and contaminated with substantial levels of radioactive fission products.

Additional objects and features of the present invention will appear from the following description in which the preferred embodiments have been set forth in detail in conjunction with the accompanying drawings. While the preferred embodiments relate generally to a conventional reprocessing plant or method of the solvent extraction type, it is apparent that these principles are also generally applicable to essentially any conventional reprocessing method or plant.

DESCRIPTION OF THE PREFERRED EMBODIMENTS

Figure 1:
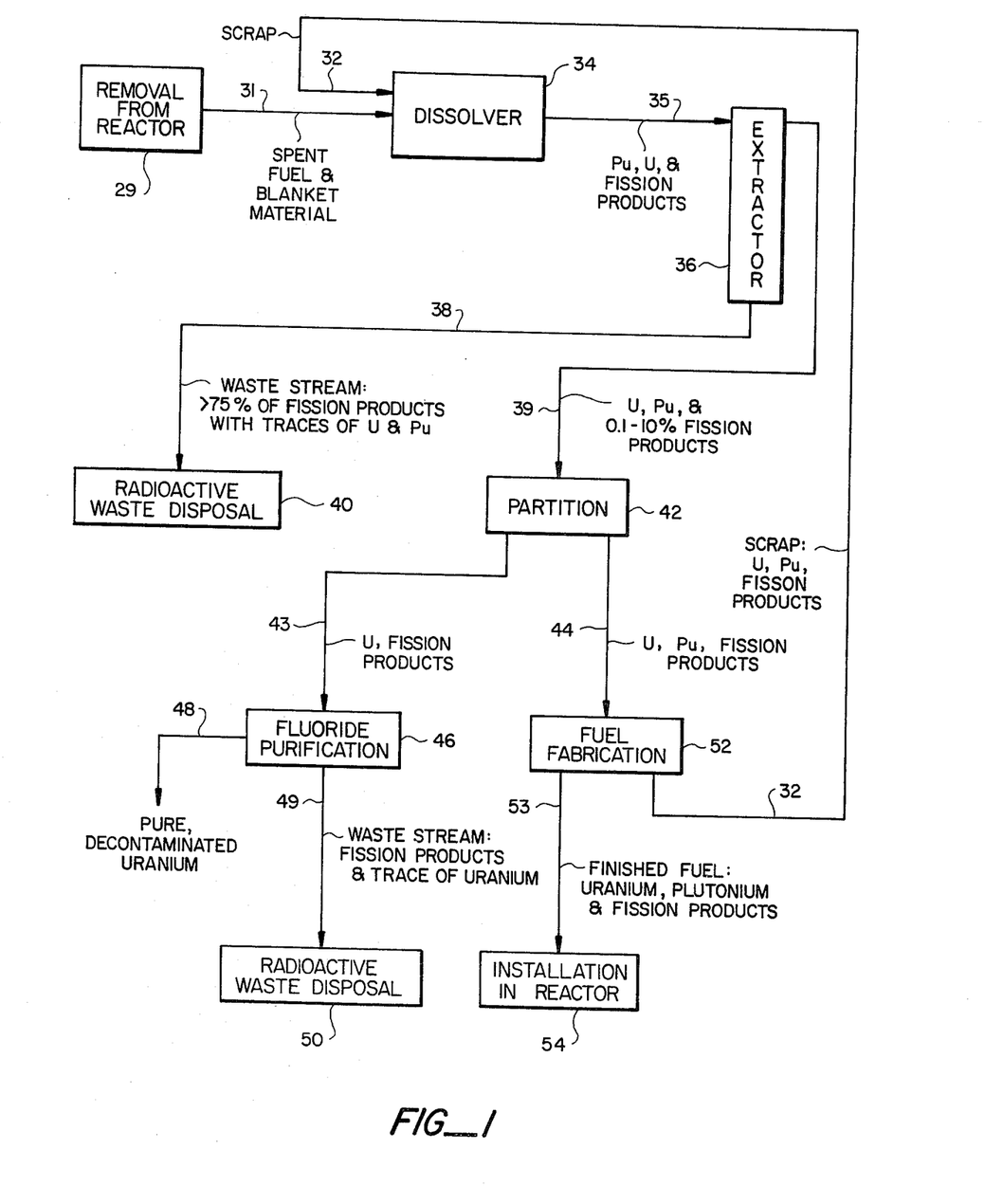
FIG. 1 is a block diagram illustrating the steps for reprocessing spent nuclear reactor fuel according to the present invention.

Referring to FIG. 1, reference numeral 29 indicates the step of removing spent fuel and blanket material from a nuclear reactor (not shown). This is the first step in the reprocessing cycle. The sources of material for the reprocessing cycle include spent fuel, spent blanket material, and scrap from the process of fuel fabrication described below. The scrap materials enter the process by stream 32. Blanket material is combined with core material in the process in order to eliminate the potential diversion path which would arise from separate processing of blanket fuel elements.

The spent fuel and blanket material in stream 31 and the scrap material in stream 32, FIG. 1 together enter the dissolver system 34. Within the dissolver system these materials are dismembered and concentrated into a liquid solution. The dissolver feed is prepared using either a chop and leach process or oxidation reduction cycles or other known dissolving techniques. Nitric acid is used for the dissolving medium and the output stream 35 contains plutonium, uranium and radioactive fission products in an aqueous solution. This stream is thereafter clarified by settling or filtration or by centrifugation to remove any undissolved solids.

The output stream 35 from the dissolver system 34 is passed to an extractor 36. An extractor is a device for bringing two phases together in a liquid to liquid solvent extraction process. In the preferred embodiment a mixer settler, a pulsed column, a packed column or a centrifugal contactor can be used. The extractor has an output product stream 39 which contains substantially all of the uranium, plutonium, and a substantial amount of the radioactive fission products from the original input stream 35. This product stream is an organic solution and in the preferred embodiment contains between 0.1 and 10% by weight of the fission products originally present in the input stream 35 to the extractor. The extractor has a waste stream 38 which contains the remainder of the fission products originally present in the dissolver output stream 35. The waste stream also contains negligible traces of both uranium and plutonium, typically less than 0.1% of the amounts in stream 35. The waste stream is transferred to a conventional radioactive waste disposal system 40.

The extractor 36, FIG. 1, has only one feed point in contrast to the prior art extractor 9, FIG. 3 with multiple feed points 10. The option of moving the feed inlet down the column to convert extraction stages into scrub stages has been eliminated. There is also no provision for increasing the feed rate of scrub solution. This is done to prevent scrub stages from being increased by moving the feed point or increasing scrub flow rate and thereby permitting the column to separate more of the fission products from the plutonium. In the preferred embodiment the feed point is positioned on the column so that the amount of radioactive fission products contaminating the product stream is predetermined and cannot be decreased in a simple manner. Remote maintenance, and remote control piping connectors are not provided.

Figure 2:
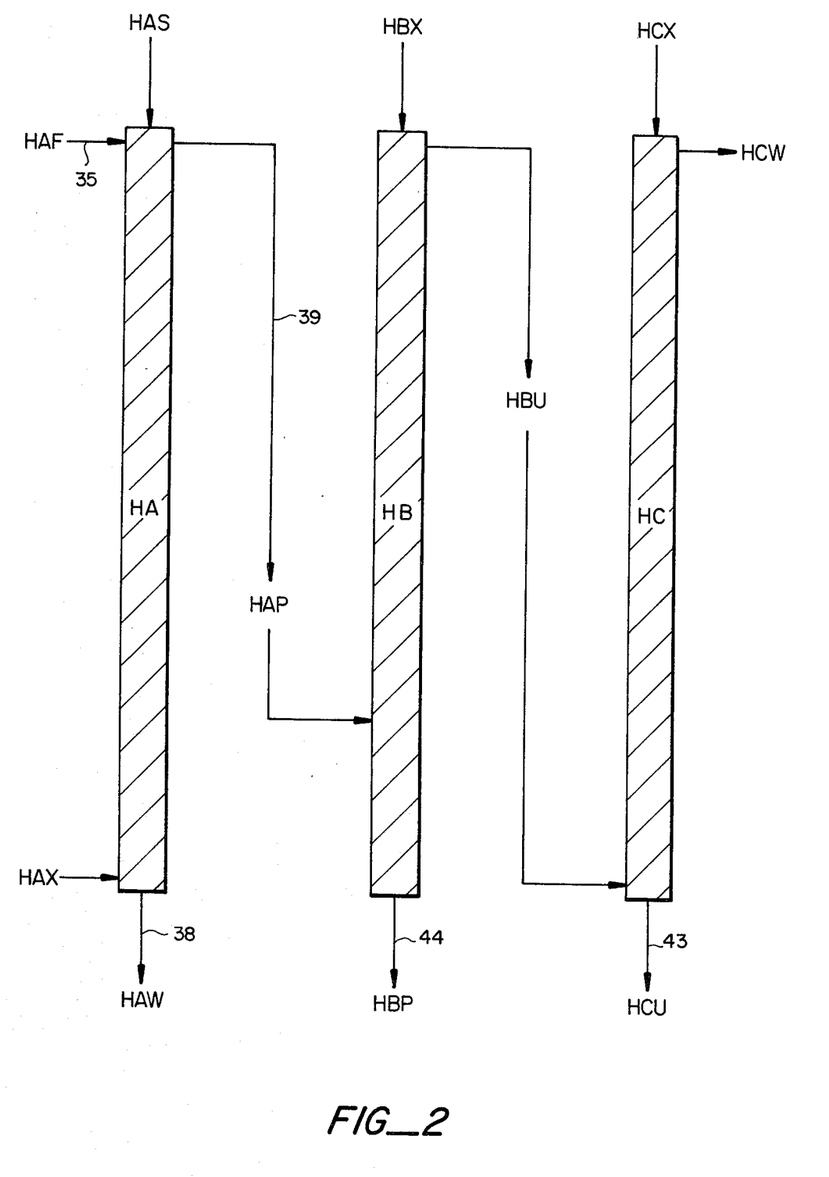
FIG. 2 is a diagram illustrating the solvent extraction process for reprocessing spent nuclear reactor fuel according to the present invention.

The design of the extractor 36, FIG. 2 insures that to move the feed point the reprocessing plant must be shut down and the extractor and surrounding piping and equipment must be decontaminated. The area then must be entered by skilled personnel and a new feed point welded on to the extractor, or a new or additional extraction device installed. Such a conversion requires a substantial amount of equipment, skills, and time of the order of several weeks to several months to perform.

In one embodiment the extractor 36, FIG. 1 contains no scrub stages and the scrub feed is omitted. There is no provision made in this embodiment for scrubbing radioactive fission products out of the product stream from the extractor. The extractor has no external fittings for connecting a scrub stream to the column and to provide such an inlet point would require the plant to be shut down, decontaminated, and an additional fitting be welded onto the extractor. In addition, an external piping and feed system would need to be provided. In an alternative embodiment one scrub stage is used to limit the radioactivity in the product stream 39 when feed material with short cooling times is processed.

The extractor 36 also has no facilities such as hold tanks, piping, valves and transfer pumps, jets, or air lifts for recycling the product stream 39 to the extractor. The plant and the process contemplated by the present invention thereby prevents the product stream from achieving a higher decontamination factor than the first pass through the extractor. The product stream can not be run repeatedly through the extractor to remove additional fission products.

The product stream 39, FIG. 1 from the extractor 36 next undergoes the step of partitioning 42. A scrub stream feed contains a reducing agent which converts the plutonium to the +3 state which is essentially insoluble in the organic solvent. The partition contactor has one aqueous output stream 44 wherein the plutonium is concentrated relative to product stream 39, and which contains an excess of uranium as a diluent. In other words, the quantity of uranium is equal to or greater than the quantity of plutonium. The ratio of plutonium and uranium is controlled to produce a "master mix" convenient for fuel fabrication, typically containing 20-25% plutonium and 80-75% uranium. This stream also contains a substantial amount of radioactive fission products. The remaining uranium and fission products leave the partition contactor in the organic solvent with the uranium product stream 43.

The partition operation 42 does not remove radioactive fission products. All of the radioactivity in stream 39 is distributed between streams 43 and 44, but most of the radioactivity goes with the plutonium stream 44 in every case. Normally all of the plutonium mixed with uranium is discharged in the fuel fabrication feed stream 44 and is sufficiently contaminated with radioactive fission products for easy detection of small amounts. For very long-cooled fuel it may be desirable in some cases to supplement the residual radioactivity at this point by addition of suitable long-lived fission product isotopes (such as Ruthenium-106, Zirconium-95 or Cesium-137), or activation products such as Cobalt-60. If the plutonium output is inadvertently or intentionally shifted from the aqueous stream 44 to the uranium product stream 43, the plutonium along with the uranium is stripped to an aqueous solution that is diluted with a large excess of uranium and sufficient fission products to prevent undetected diversion of the plutonium.

The uranium product stream 43, FIG. 1 consists of uranium nitrate dissolved in dilute nitric acid and contaminated with radioactive fission products. After stripping, this stream undergoes a fluoride conversion operation 46. Fluoride purification includes reducing the aqueous stream 43 to a dry solid stream and producing uranium oxide for example using a fluid bed denitrator. The uranium oxide is thereafter fluorinated with either fluorine gas in a single stage contactor, or with bromine tri-fluoride in a single stage contactor or in two stages with hydrogen fluoride in the first stage and either fluorine gas or bromine tri-fluoride in the second stage. The uranium oxide is converted into uranium hexafluoride and is thereafter purified by either distillation or absorption—desorption to produce substantially pure uranium in the output stream 48. This stream may be used as feed to an isotope separation process such as gaseous diffusion or centrifugation to produce a reduced amount of uranium of higher enrichment in U-235. A portion of this stream may be reconverted to uranium oxide and used to fabricate new fuel or blanket elements for nuclear reactors according to known techniques. Scrap and by-products from the fuel fabrication process 52 are recycled back to the dissolver 34 and the waste stream 49 undergoes radioactive waste disposal 50 according to known methods.

The plant design according to the present invention is capable of producing uranium of high purity because the isotope separation process is more conveniently performed using pure uranium. However, the equipment for added cycles of solvent extraction or ion exchange purification of uranium is not provided or used because such equipment can be readily altered to accomplish further partitioning of the plutonium from the uranium and further decontamination from the fission products. The fluorination process and equipment also cannot be physically converted to purify plutonium. Fluoride purification can only make $PuF_4$, which is non-volatile. If plutonium intentionally or inadvertently enters the fluoride portion of the process, plutonium remains mixed with radioactive fission products in the still residues and cannot be separated from them by this method.

The fuel fabrication feed stream 44, FIG. 1, is a dilute nitric acid solution containing a mixture of uranium, plutonium and fission products. This stream undergoes the process 52 of fuel fabrication wherein the stream is first diluted with uranium from the uranium product stream 48. This dilution with uranium adjusts the final uranium and plutonium ratio in the fuel as required by the nuclear design of a given reactor. After dilution the stream is subjected to the sol-gel process in which the uranium, plutonium and fission product mixture is converted to small particles of mixed oxides. The blend can also be denitrated by conventional techniques and fired to a powder of uranium oxide. In either case, the fuel rods are thereafter fabricated by conventional vibratory compaction processes in which powder or particles are introduced into cladding tubes which are then hermetically sealed. Alternatively the powder may be fabricated into pellets using a remotely operated pellet process, loaded into cladding tubes, and installed 54 in a nuclear reactor. The output The output 53 from the fuel fabrication process 52 is a mixed oxide containing uranium oxide, plutonium oxide and sufficient radioactive fission products or other added radioactivity to give the fuel a high radiation background for ease of detection and to deter handling except in massive shielded containers.

The present invention also contemplates the elimination of the scrap purification recovery facility commonly found in most reprocessing installations. The recycling of scrap is illustrated in at 24, FIG. 3. In prior reprocessing plants scrap purification was a general purpose, flexible operation which has potential for conversion to provide supplemental separations to further purify plutonium. According to the present invention, all scrap containing heavy elements is returned to the dissolver 34 in the scrap stream 32 and is again mixed with radioactive fission products. This scrap stream also includes any residues from the sol-gel or the remote powder and pelletizing processes.

Referring to FIG. 2, the preferred embodiment also includes a plurality of flow sheets where in the objectives described above are achieved. The flow sheets are based upon known chemical equilibrium data for given concentrations of solvent, nitric acid, uranium, and plutonium at various flow ratios.

It should be understood that although FIG. 2 is drawn as a packed column, this manner of illustration is a chemical engineering convention and is intended to apply equally to rotary contactors, pulsed columns and mixer-settlers.

In FIG. 2, three solvent extraction columns HA, HB, and HC are shown. Within these columns the extraction process 36, FIG. 1 and the partition process 42 are conducted. The HA column has an HAF input stream 35 which is the input feed solution to the HA column. This stream comes from the dissolver 34, FIG. 1 and contains a liquid solution of plutonium, uranium, and fission products in the aqueous phase. Another input to the HA column is the HAS stream which is a scrub solution of one molar nitric acid. In the embodiment having no scrub stages in the extractor, the HAS stream does not exist and its flow rate is zero. The HAS solution removes some of the fission products from the HAP stream 39 which is the product output stream from the HA column. The HAP stream is in the organic phase and contains essentially all of the uranium and plutonium obtained from the HAF stream. Another input to the HA column is the HAX stream which is an extractant containing 30% tributal phosphate dissolved in either kerosene, or dodocane or similar Hydrocarbon liquid. The HAX stream contains a solvent that selectively extracts the uranium, plutonium, and some fission products out of the aqueous HAF stream. The discharge from the HA column is the HAW waste stream 38. This waste stream carries off the remaining fission products from the HAF stream.

In operation the aqueous or water phase goes down the columns and the organic phase goes up the columns. More specifically in the HA column the HAX stream travels upward and the HAG stream travels downward. Generally similar flow paths are followed in packed columns or in pulse columns, or in horizontal mixer settlers. In centrifugal contactor extraction devices, the organic stream enters near the perimeter and leaves near the center of the rotating elements. The uranium and plutonium dissolved in the HAF feed stream are transferred into the solvent phase within the HA column. The solvent phase proceeds to the upper part of the column carrying with it some of the fission products. In the upper part of the column the HAS scrub solution washes some of the fission products back down the column while most of the uranium and plutonium remain in the solvent solution.

In the HB column, FIG. 2, the partition process 42, FIG. 1, is performed. The HAP stream 39 is the feed stream input to the HB column and contains a mixture in the organic phase of uranium, plutonium and some long-lived fission products. A second unput to the HB column is the aqueous HBX stream which is an extractant. The HBX stream pulls the plutonium out of the HAP solvent stream by reducing the oxidation state of plutonium from any mixture of +4 and +6 states to +3 state. Plutonium in the +3 state is essentially insoluble in the solvent phase. The plutonium leaves the HB column in an aqueous HBP stream 44. The HBP stream carries with it sufficient fission products which emit penetrating gamma radiation so that the plutonium in the stream is "tagged" radioactively and small amounts are readily detectable. The other output for the HB column is the HBU stream which contains most of the uranium plus some fission products.

The HC column, FIG. 2, recovers the uranium in the HBU stream. The input to the HC column is the HBU stream which contains uranium in the organic phase. The other input to the HC column is the HCX stream which is the stripping agent, a one tenth molar solution of nitric acid. The output from the HC column is the HCU stream 43 which contains the uranium and some fission products in an aqueous solution. The HCU stream goes to the fluoride purification process 46, FIG. 1 described above. The other output from the HC column is the HCW stream which is a waste stream containing the solvent. This stream goes to a solvent recovery system (not shown) and is recycled back into the process.

In preparing the flow sheets described below a nominal fuel and blanket composition for a typical large breeder reactor was used. It was assumed that the core of the breeder reactor consisted of 3,850 kilograms of plutonium and 16,600 kilograms of uranium which had been subjected to an average burn-up of 71,000 megawatt days per ton of uranium plus plutonium. The axial blanket of the reactor was assumed to contain 230 kilograms of plutonium and 11,500 kilograms of uranium that were subjected to a burn-up of 4,500 megawatt days per metric ton of uranium plus plutonium. At discharge the core had been operating for 380 full power days at a load factor of 70% and contained isotopes of the following principal fission products: 150 kilograms of zirconium, 2.5 kilograms of niobium, and 190 kilograms of ruthenium, together with varying amounts of about 25 other fission products which are less soluble in the extracting solvent, or which have short-lived or less penetrating radiation. It was assumed that discharge from this breeder reactor occured every 450 days and included one half of the core. The process typically uses fuel "cooled" for about 100 days after discharge from the reactor, and preferably less than 550 days.

Table One listed below is one solvent extraction embodiment. The main constituents in the HAF stream are given above. In this embodiment the HA column has no scrub stages and the flow rate of the HAS stream is zero. The HA column operates at 25° C. and consists of six stages. The HB column contains ten stages and operates at 50° C. The HC column contains six stages and operates at 50° C.

TABLE 1

| NAME OF STREAM | STREAM FLOW RATE (VOL/TIME) | URANIUM CONCENTRATION (MOLAR SOLUTION) | PLUTONIUM CONCENTRATION (MOLAR SOLUTION) | NITRIC ACID CONCENTRATION (MOLAR SOLUTION) | FISSION PRODUCTS AFTER ONE HUNDRED DAY COOL DOWN (CURIES/LITER) | | | | TPB** |
|---|---|---|---|---|---|---|---|---|---|
| | | | | | Zr | Nb | Ru | Gross FP | |
| HAF | 100 | 1.10 | .159 | 2.0 | 656 | 1101 | 1062 | 6030 | — |
| HAS | 0 | — | — | — | — | — | — | — | — |
| HAX | 350 | — | — | — | — | — | — | — | 30% |
| HAP | 371 | .296 | .0429 | .286 | 28.4 | 8.28 | 4.52 | 6.03* | 30% |
| HAW | 84 | $<10 \times 10^{-3}$ | $<10^{-3}$ | 1.12 | — | — | — | — | — |
| HBX | 200 | — | — | 0.30 | — | — | — | — | (REDUCTANT $H_2NOH$ $H_2N_2$)*** |
| HBP | 210 | .315 | .0796 | .75 | 50.2 | 14.6 | 5.44 | 10.7 | — |
| HBU | 360 | .121 | $10^{-9}$ | .025 | $<10^{-6}$ | $<10^{-6}$ | 1.48 | $<10^{-6}$ | 30% |
| HCU | 489 | .0891 | — | .117 | — | — | 0.23 | — | — |
| HCW | 350 | <.001 | — | $5 \times 10^{-3}$ | — | — | 1.20 | — | 30% |
| HCX | 465 | — | — | 0.10 | — | — | — | — | — |

*Based upon 0.1 vol/0 entrainment in HAP stream
**Tributylphosphate concentration in hydrocarbon solvent, % by weight.
***Hydroxylamine, or hydrazine, or other suitable reducing agents for plutonium, including ferrous sulfamate or electrolytic or photolytic reduction using plus 4 uranium.

Table Two below lists the fission products present after 550 days of cool down for the flow sheet of Table One

TABLE 2

| NAME OF STREAM | FISSION PRODUCTS AFTER 550 DAY COOL DOWN (CURIES/LITER) | | | |
|---|---|---|---|---|
| | Zr | Nb | Ru | Gross FP |
| HAF | 5.39 | 11.8 | 278 | 1224 |
| HAP | .23 | .088 | 1.18 | 1.22 |
| HBP | .41 | .16 | 1.42 | 2.16 |
| HBU | $<10^{-6}$ | $<10^{-6}$ | 0.39 | $<10^{-6}$ |
| HCU | — | — | .058 | — |
| HCW | — | — | .32 | — |

It should be noted that the HAP stream with a 0.0429 molar concentration of plutonium has a concentration of long-lived fission products of about 45 curies per liter after a 100 day cool down period and a concentration of about 3 curies per liter after a 550 day cool down period. It should further be noted that the HBP stream, which is the product stream containing the recovered plutonium with a 0.0796 molar concentration contains about 80 curies per liter of long lived fission products after 100 days and about 4 curies per liter of fission products after 550 days. Further, most of the fission products leave the HB column in the HBP stream and about 3% of the total in the HAP stream leave this column with the HBU stream.

Table Three below is an alternative solvent extraction embodiment. The constituents in the HAF stream are the same as in Table One as described above. The flow sheet is based on an HA column having one scrub stage and an HAS stream of one molar nitric acid. The HA column also includes six stages of extraction and operates at 50° C. The HB column contains ten stages and operates ad 50° C. The HC column operates with six stages and at 50° C.

TABLE 3

| NAME OF STREAM | STREAM FLOW RATE (VOL/TIME) | URANIUM CONCENTRATION (MOLAR SOLUTION) | PLUTONIUM CONCENTRATION (MOLAR SOLUTION) | NITRIC ACID CONCENTRATION (MOLAR SOLUTION) | FISSION PRODUCTS AFTER ONE HUNDRED DAY COOL DOWN (CURIES/LITER) | | | | |
|---|---|---|---|---|---|---|---|---|---|
| | | | | | Zr | Nb | Ru | Gross FP | TBP* |
| HAS | 100 | — | — | 1.0 | — | — | — | — | — |
| HAF | 100 | 1.10 | .159 | 3.0 | 656 | 1101 | 1062 | 6030 | — |
| HAX | 350 | — | — | — | — | — | — | — | 30% |
| HAP | 367.9 | .299 | .0432 | .0878 | 9.2 | 3.4 | 10.6 | .06 | 30% |
| HAW | 194.4 | $<10^{-3}$ | $<10^{-3}$ | 1.89 | — | — | — | — | — |
| HBX | 200 | — | — | 0.30** | — | — | — | — | — |
| HBU | 360 | .121 | $<10^{-9}$ | .025 | nil | nil | 3.5 | nil | 30% |
| HBP | 210 | .315 | .0796 | .40 | 16.1 | 6.0 | 12.6 | 0.11 | — |
| HCX | 465 | — | — | 0.1 | — | — | — | — | — |
| HCW | 350 | $<1 \times 10^{-3}$ | — | $5 \times 10^{-3}$ | — | — | 2.8 | — | 30% |
| HCU | 468 | .0930 | — | 0.111 | — | — | 0.6 | — | — |

*Percent by weight of tributylphosphate in hydrocarbon solvent
**Also contains reducing agent as noted in Table 1 for HBX stream.

Table Four below lists the long-lived fission products present after a 550 day cool down for the flow sheet of Table Three.

TABLE 4

| NAME OF STREAM | FISSION PRODUCTS AFTER 500 DAY COOL DOWN (CURIES/LITER) | | | |
|---|---|---|---|---|
| | Zr | Nb | Ru | Gross FP |
| HAF | 5.39 | 11.8 | 278 | 1224 |
| HAP | .076 | .037 | 2.78 | .012 |
| HBP | .133 | .065 | 3.3 | .021 |
| HBU | nil | nil | .91 | nil |
| HCU | nil | nil | .15 | nil |
| HCW | nil | nil | .74 | nil |

Referring to Tables Three and Four, it should be noted that the HAP stream with a 0.0432 molar concentration of plutonium has a concentration of long-lived fission products of about 23 curies per liter after a 100 day cool down period and a concentration of about 3 curies per liter after a 550 day cool down period. It should further be noted that the HBP stream, which is the product stream containing the recovered plutonium with a 0.0796 molar concentration, contains about 35 curies per liter of long lived fission products after 100 days and about 3.5 curies per liter of fission products after 550 days.

The above embodiments have relative flow rates which can influence the exact quantity of fission products present with the plutonium. To ensure that these flow rates are maintained, the preferred embodiment uses pumps which operate during normal operation at near their rated flow, using fixed speed motors. By sizing the pumps in this manner a flow increase cannot be obtained without physically installing a new pump. Thus the relative rates of flow between the feed and extractant streams cannot readily be varied to improve the decontamination factor in any of the columns.

The present invention also contemplates ganging the flow controllers in the columns together so that the flow ratios cannot be changed. These flow controllers also prevent the slowing of one pump with respect to another pump and thereby changing the flow ratios within the reprocessing cycle.

Although the above described embodiments are directed primarily to reprocessing spent fuel from fast breeder reactors, the same techniques and inventive concepts can also be applied to reprocessing spent fuel from light water reactors. The fuel from such reactors is similar to that from a fast breeder reactor except the amount of plutonium and fission products is considerably less relative to the uranium content. In a fast breeder reactor, the ratio of plutonium to uranium is approximately one to six for the core and blanket material. In contrast, for a light water reactor the concentration in spent fuel of plutonium in uranium is approximately six tenths of one percent. The process steps are exactly the same except the plutonium content is so low that it has almost no influence on the extraction coefficients of the uranium and nitric acid.

The concept of limited-by-design processes for decontamination and partitioning may also be advantageously applied to fuels not now in common use, such as mixtures of Thorium, U-235 U-238 and U-233 in spent fuel, which also usually contain significant amounts of plutonium. It may also be applied to fuels using materials other than oxides of uranium and plutonium, for example, metal and alloy fuels; carbide or nitride fuels, or combinations thereof.

Thus, although practical methods contemplated for carrying out the present invention have been herein shown and described, it will be apparent that modification and variation may be made without departing from what is regarded to be the subject matter of the invention.

What is claimed is:

1. A method for processing spent nuclear reactor fuel, comprising the steps of:
   (a) dissolving spent nuclear reactor fuel into a spent fuel stream, said stream containing plutonium, uranium, and short-lived and long-lived radioactive fission products in an aqueous solution;
   (b) extracting from the spent fuel stream plutonium and uranium together with a substantial quantity of long-lived fission products and discharging them together in an organic product stream; and
   (c) partitioning the product stream into a uranium product stream and a fuel fabrication stream containing plutonium, uranium and long-lived fission products in an aqueous solution, the quantity of uranium in the fuel fabrication stream being equal to or greater than the quantity of plutonium therein.

2. The method of claim 1 including the step of continuously maintaining the plutonium with both diluting uranium and contaminating fission products while performing the steps recited in claim 1.

3. The method of claim 1 wherein the step including extracting long-lived fission products from the spent fuel stream results in contaminating the product stream with said fission products to a concentration of between about 0.1% and 10% of the fission products present in the spent fuel stream.

4. The method of claim 1 wherein the step of partitioning includes:
   (a) removing substantially all of the plutonium from the organic product stream along with most of the fission products and said quantity of uranium and discharging a fuel fabrication stream which is a blend of between 15% and 25% by weight of plutonium in uranium and residual fission products in an aqueous solution; and
   (b) removing substantially all of the remaining uranium and discharging it in the uranium product stream.

5. The method of claim 1 wherein the streams are transferred during operation at fixed flow rates so that the relative flow rates of the streams cannot be varied.

6. A method for processing spent nuclear reactor fuel, comprising the steps of:
   (a) dissolving spent nuclear reactor fuel into a spent fuel stream, said stream containing plutonium, uranium and short and long-lived radioactive fission products in an aqueous solution;
   (b) extracting from the spent fuel stream plutonium and uranium together with a substantial quantity of the long-lived fission products and discharging them together in an organic product stream;
   (c) partitioning the product stream into a uranium product stream and a fuel fabricating stream containing plutonium, uranium, and long-lived fission products in an aqueous solution; and
   (d) fluoride purifying the uranium product stream for producing substantially pure uranium, any plutonium remaining after fluoride purification of the uranium being contaminated with long-lived fission products.

7. The method of claim 6 including the step of exclusively fluoride purifying the uranium product stream so that plutonium of purity sufficient to fabricate a nuclear weapon is not produced.

8. A method for processing spent nuclear reactor fuel, comprising the steps of:
   (a) dissolving spent nuclear reactor fuel into a spent fuel stream, said stream containing plutonium, uranium, and short and long-lived radioactive fission products in an aqueous solution;
   (b) extracting from the spent fuel stream plutonium and uranium together with a substantial quantity of the long-lived fission products and discharging them together in an organic product stream;
   (c) partitioning the product stream into a uranium product stream and a fuel fabrication stream containing plutonium, uranium, and some long-lived fission products in an aqueous solution; and
   (d) fabricating a mixed oxide nuclear reactor fuel from the fuel fabrication stream, said mixed oxide fuel having sufficient penetrating radiation from residual radioactivity to be readily detectable if diversion is attempted.

9. The method of claim 8 further including the steps of producing scrap materials while performing the steps recited in claim 8 and recycling all of said scrap materials containing uranium and plutonium into the spent fuel stream of step (a) of claim 8.

10. A method for processing spent nuclear reactor fuel, comprising the steps of:
    (a) directing an extractant stream (HAX) and a high activity feed stream (HAF) into a countercurrent flow liquid-liquid contactor (HA), said feed stream (HAF) containing plutonium, uranium, and radioactive fission products in an aqueous solution;
    (b) discharging a high activity waste stream (HAW) from the liquid-liquid contactor;
    (c) discharging a high activity organic product stream (HAP) from the liquid-liquid contactor; and
    (d) discharging in the high activity product stream (HAP) long-lived radioactive fission products having sufficient radioactivity that the high activity product stream (HAP) has a concentration of between 10 and 80 curies per liter after a 100 day cool-down period together with plutonium having a concentration of less than 0.06 molar.

11. The method of claim 10 wherein the step of discharging includes discharging in the HAP stream long-lived radioactive fission products having sufficient radioactivity that the high activity product stream (HAP) has a concentration of between 1.0 and 5 curies per liter after a 550 day cool-down period.

12. A method for processing spent nuclear reactor fuel, comprising the steps of:
    (a) directing an extractant stream (HAX) and a high activity feed stream (HAF) into a countercurrent flow liquid-liquid contactor (HA), said feed stream (HAF) containing plutonium, uranium, and radioactive fission products in an aqueous solution;
    (b) discharging a high activity waste stream (HAW) from the HA contactor;
    (c) discharging a high activity organic product stream (HAP) from the HA exchanger into a second countercurrent liquid-liquid contactor (HB);
    (d) directing an extractant stream (HBX) into the HB exchanger;
    (e) discharging a uranium product stream (HBU) and a plutonium product stream (HBP) from the HB exchanger; and
    (f) discharging in the plutonium product stream (HBP) long-lived radioactive fission products having sufficient radioactivity that the plutonium product stream (HBP) has a concentration of between 5 and 50 curies per liter after a 100 day cool-down period together with plutonium having a concentration of less than 0.06 molar.

13. The method of claim 12 further including the step of discharging in the uranium product stream (HBU) uranium having a concentration of between 0.08 and 0.16 molar and plutonium having a concentration of less than $10^{-6}$ molar.

* * * * *